United States Patent
Sawada et al.

(10) Patent No.: US 9,081,104 B2
(45) Date of Patent: Jul. 14, 2015

(54) RADIATION DETECTION APPARATUS AND RADIATION DETECTION SYSTEM

(71) Applicant: CANON KABUSHIKI KAISHA, Tokyo (JP)

(72) Inventors: Satoru Sawada, Fujioka (JP); Masato Inoue, Kumagaya (JP); Shinichi Takeda, Honjo (JP); Takamasa Ishii, Honjo (JP); Taiki Takei, Yokohama (JP); Kota Nishibe, Honjo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/200,142

(22) Filed: Mar. 7, 2014

(65) Prior Publication Data
US 2014/0284487 A1 Sep. 25, 2014

(30) Foreign Application Priority Data
Mar. 21, 2013 (JP) ................................. 2013-059062

(51) Int. Cl.
*G01J 5/02* (2006.01)
*G01T 1/20* (2006.01)
*G01T 1/202* (2006.01)

(52) U.S. Cl.
CPC .............. *G01T 1/2002* (2013.01); *G01T 1/202* (2013.01)

(58) Field of Classification Search
CPC ... G01T 1/2002; G01T 1/2006; G01T 1/2018; G01T 1/20; H01L 33/60
USPC ....................................................... 250/368
See application file for complete search history.

(56) References Cited

U.S. PATENT DOCUMENTS

| | | | | |
|---|---|---|---|---|
| 6,657,201 B2 * | 12/2003 | DeJule | ................... | 250/370.11 |
| 7,126,130 B2 * | 10/2006 | Hennessy et al. | ........ | 250/370.11 |
| 8,803,098 B2 * | 8/2014 | Arimoto et al. | ........... | 250/361 R |
| 2006/0033040 A1 | 2/2006 | Okada et al. | ............... | 250/484.2 |
| 2006/0065944 A1 | 3/2006 | Mochizuki et al. | ...... | 250/370.11 |
| 2009/0283685 A1 | 11/2009 | Takeda et al. | ............... | 250/370.11 |
| 2009/0289170 A1 | 11/2009 | Nomura et al. | ............... | 250/206 |
| 2010/0102236 A1 | 4/2010 | Inoue et al. | ............... | 250/361 R |
| 2010/0224784 A1 * | 9/2010 | Homma et al. | ............... | 250/368 |
| 2012/0119094 A1 | 5/2012 | Inoue et al. | ............... | 250/363.01 |
| 2012/0318990 A1 | 12/2012 | Tsujii et al. | ................... | 250/366 |
| 2013/0134312 A1 | 5/2013 | Nagano et al. | ........... | 250/363.01 |
| 2013/0221198 A1 | 8/2013 | Sawada et al. | ................ | 250/208 |
| 2013/0322598 A1 | 12/2013 | Saruta et al. | .................... | 378/62 |
| 2014/0103216 A1 | 4/2014 | Sasaki et al. | ............. | 250/361 R |

FOREIGN PATENT DOCUMENTS

JP 2012-037454 2/2012

* cited by examiner

*Primary Examiner* — Kiho Kim
(74) *Attorney, Agent, or Firm* — Fitzpatrick, Cella, Harper & Scinto

(57) ABSTRACT

A radiation detection apparatus includes a sensor panel which includes a photoelectric conversion unit, a scintillator layer disposed above the photoelectric conversion unit and configured to convert radiation into light, a reflection layer disposed above the scintillator layer and configured to reflect part of light generated by the scintillator layer toward the sensor panel; and a protective layer which covers the scintillator layer from above the reflection layer. The scintillator layer is fixed on the sensor panel. The reflection layer is fixed on the protective layer. Part of the protective layer is bonded to the sensor panel with an adhesive material so as to seal the scintillator layer and the reflection layer with the protective layer and the sensor panel. An upper surface of the scintillator layer includes a portion which is not fixed to the reflection layer.

20 Claims, 5 Drawing Sheets

RADIATION DETECTION APPARATUS AND RADIATION DETECTION SYSTEM

BACKGROUND OF THE INVENTION

1. Field of the Invention

The present invention relates to a radiation detection apparatus and a radiation detection system.

2. Description of the Related Art

Japanese Patent Laid-Open No. 2012-37454 discloses a radiation detection apparatus having a scintillator layer formed on an array substrate having photoelectric conversion elements. A moisture-proof layer made of Al covers the scintillator layer. This moisture-proof layer also functions as a reflection layer for reflecting, to a sensor panel, light, of the light generated by the scintillator, which propagates in a direction opposite to the array substrate.

SUMMARY OF THE INVENTION

According to some embodiments, provided is a radiation detection apparatus comprising, a sensor panel which includes a photoelectric conversion unit configured to convert light into charge; a scintillator layer disposed above the photoelectric conversion unit of the sensor panel and configured to convert radiation into light having a wavelength convertible by the photoelectric conversion unit; a reflection layer disposed above the scintillator layer and configured to reflect part of light generated by the scintillator layer toward the sensor panel; and a protective layer which covers the scintillator layer from above the reflection layer, wherein the scintillator layer is fixed on the sensor panel, the reflection layer is fixed on the protective layer, part of the protective layer is bonded to the sensor panel with an adhesive material so as to seal the scintillator layer and the reflection layer with the protective layer and the sensor panel, and an upper surface of the scintillator layer includes a portion which is not fixed to the reflection layer.

Further features of the present invention will become apparent from the following description of exemplary embodiments (with reference to the attached drawings).

DESCRIPTION OF THE EMBODIMENTS

Figure 1:
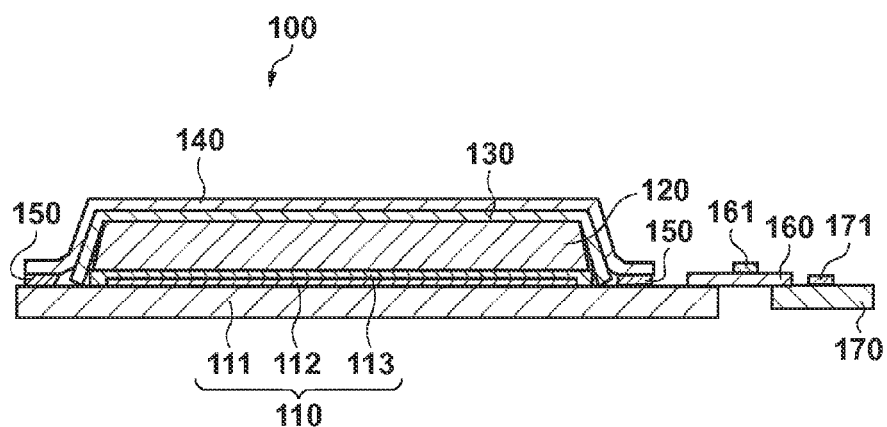
FIG. 1 is a view for explaining an example of the arrangement of a radiation detection apparatus according to some embodiments of the present invention.

In the radiation detection apparatus disclosed in Japanese Patent Laid-Open No. 2012-37454, the moisture-proof layer covering the upper surface of the scintillator layer is in contact with the scintillator layer to improve a resolution. For this reason, when the moisture-proof layer thermally expands, a stress acts on the scintillator layer. This may peel off the scintillator layer. Some aspects of the present invention therefore propose a technique for reducing the stress applied to the scintillator layer of the radiation detection apparatus.

The embodiments of the present invention will be described below with reference to the accompanying drawings. The same reference numerals denote the same elements throughout various embodiments, and a repetitive description will be omitted. In addition, the respective embodiments can be changed and combined, as needed.

An example of the arrangement of a radiation detection apparatus 100 according to some embodiments will be described with reference to FIG. 1. FIG. 1 is a sectional view of the radiation detection apparatus 100. The radiation detection apparatus 100 can include a sensor panel 110, a scintillator layer 120, a reflection layer 130, and a scintillator protective layer 140.

The sensor panel 110 may have any arrangement as long as it can convert light into charge. For example, the panel may have an existing arrangement, and hence an example of such an arrangement will be briefly described below. The sensor panel 110 as an example can include a sensor substrate 111, a pixel array 112 formed on the sensor substrate 111, and a sensor protective layer 113 covering the pixel array 112. The sensor substrate 111 can be formed from a material such as glass or heat-resistant plastic. The pixel array 112 can function as a photoelectric conversion unit. The pixel array 112 can include a plurality of pixels including photoelectric conversion elements and switch elements, each formed by using a semiconductor such as amorphous silicon (a-Si), and signal lines for supplying driving signals to the switch elements. The plurality of pixels may be arranged in a two-dimensional array. Each photoelectric conversion element may be of any one of the types including the MIS type and the PIN type and converts light into charge. Each switch element can be formed by using a transistor such as a TFT. The sensor protective layer 113 covers the entire surface of the pixel array 112 to protect it. The area of the upper surface of the sensor protective layer 113 is larger than that of the upper surface of the pixel array 112. The sensor protective layer 113 is formed from a resin such as a silicone-based resin, polyimide-based resin, polyamide-based resin, epoxy-based resin, or resin containing an organic material such as paraxylene or acrylic, and especially may be formed from a thermosetting polyimide-based resin. The sensor protective layer 113 may be formed by using a resin having heat resistance so as not to deteriorate in a process with a high temperature condition such as vapor-deposition or annealing of the scintillator layer 120.

The scintillator layer 120 is disposed at a position to cover the pixel array 112 of the sensor panel 110, and converts the radiation entering the radiation detection apparatus 100 into light (for example, visible light) having a wavelength that can be converted by the photoelectric conversion elements of the pixel array 112. The radiation can be, for example, X-rays, α-rays, β-rays, or γ-rays. Radiation may enter the radiation detection apparatus 100 from the scintillator layer 120 side (the upper side of the drawing) or from the sensor panel 110 side (the lower side of the drawing). The scintillator layer 120 can be formed by, for example, a scintillator made of an alkali halide. The scintillator layer 120 may be formed in the form of an aggregate of columnar crystals on the sensor protective layer 113 of the sensor panel 110 by vapor-depositing an alkali halide such as CsI:Na or CsI:Tl. In this case, the scintillator layer 120 is fixed on the sensor panel 110. The scintillator layer 120 can be disposed at a position to cover the entire surface of the pixel array 112 of the sensor panel 110. If the pixel array 112 is rectangular, the upper and bottom surfaces of the scintillator layer 120 may also be rectangular, and may be larger than the pixel array 112. In addition, the four side surfaces of the scintillator layer 120 may be perpendicular or oblique to the surface of the sensor panel 110 (for example, the upper surface of the sensor protective layer 113). In the case shown in FIG. 1, each side surface of the scintillator layer 120 tilts such that the angle defined by the side surface and the bottom surface becomes acute.

The reflection layer 130 reflects part of the light generated by the scintillator layer 120 toward the sensor panel 110. If the scintillator layer 120 is an aggregate of columnar crystals, the light generated by the scintillator layer 120 propagates up and down along the crystals. The light propagating upward (a direction to separate from the sensor panel 110) is reflected by the reflection layer 130 to return downward (a direction to approach the sensor panel 110). The light then enters the sensor panel 110. Making the radiation detection apparatus 100 have the reflection layer 130 as described above can increase the amount of light reaching the sensor panel 110.

If the reflection layer 130 is formed from an electrically-conductive material such as a metal, the reflection layer 130 undergoes electrochemical corrosion due to the influence of the scintillator layer 120. In this embodiment, therefore, the reflection layer 130 is formed from an insulator. The reflection layer 130 can be, for example, a member formed by kneading a particulate inorganic material with a binder resin (holding member) made of an organic material and processing the resultant structure into a sheet. As an inorganic material, it is possible to use, for example, titanium dioxide, barium sulfate, calcium carbonate, silicon dioxide, or titanium oxide. As a material for the reflection layer 130, it is possible to use a white film or white PET commercially available for use as the reflecting plate of a liquid crystal backlight. More specifically, as a material for the reflection layer 130, it is possible to use, for example, Lumirror® E20 available from Toray Industries, REF-WHITE available from KIMOTO, or White Refstar® available from Mitsui Chemicals.

Figure 2:
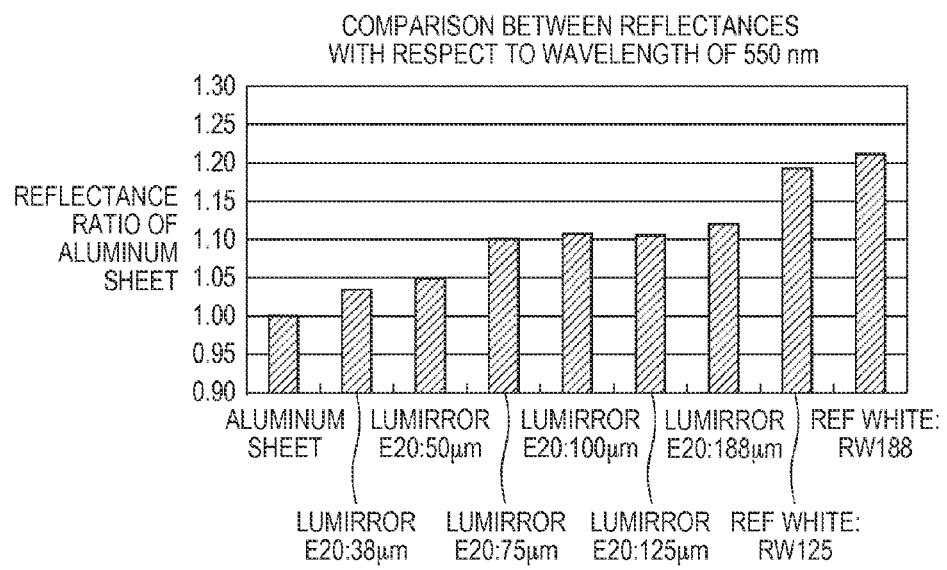
FIG. 2 is a graph for explaining the reflectance of a reflection layer according to some embodiments of the present invention.

The reflectance of the above commercially available material with respect to light will be described below with reference to FIG. 2. FIG. 2 shows reflectances with respect to light having a wavelength of 550 nm in association with combinations of various materials and thicknesses, with the glossy surface of an aluminum sheet having a reflectance of 1 with respect to light having a wavelength of 550 nm. An instantaneous multi photometric system (MCPD-700) available from OTSUKA ELECTRONICS was used to measure reflectances. Obviously, all the materials have larger reflectances than the aluminum sheet. More specifically, the aluminum sheet has a reflectance of 80%, and all of the above commercially available materials have reflectances equal to or higher than 80%. Therefore, forming the reflection layer 130 by using one of these materials can reflect light toward the sensor panel 110 more efficiently than forming a reflection layer by using an aluminum sheet. In addition, the thickness of the reflection layer 130 may fall within the range of 10 µm to 500 µm, and may fall within the range of 38 µm to 188 µm in consideration of workability in a process and characteristic balance. The graph of FIG. 2 exemplifies light having a wavelength of 550 nm. This is because when the scintillator layer 120 is formed from CsI:Tl, the visible light generated by the scintillator layer 120 has a peak near 550 nm. The reflection layer 130 may be formed by using a material and thickness that achieve a reflectance higher than that of an aluminum sheet with respect to light having another wavelength. If, for example, each photoelectric conversion element of the sensor panel 110 can convert visible light, it is possible to select a material and thickness that make the reflection layer 130 have a reflectance equal to or higher than 80% with respect to at least some of the wavelengths of visible light.

In the embodiment shown in FIG. 1, the reflection layer 130 has a shape covering the upper surface and four side surfaces of the scintillator layer 120. Another embodiment may be configured such that the reflection layer 130 covers only the upper surface of the scintillator layer 120 and does not cover some or all of the side surfaces of the scintillator layer 120. The reflection layer 130 may be in contact with part of the upper surface of the scintillator layer 120. This reduces scattered light between the upper surface of the scintillator layer 120 and the reflection layer 130 to improve the resolution of the radiation detection apparatus 100. In addition, the apparatus may have a gap (space) between part of the upper surface of the scintillator layer 120 and the reflection layer 130. This space may be mixed with a gas or may be a vacuum.

The scintillator protective layer 140 can protect the scintillator layer 120 against penetration of moisture from the atmosphere and structural breakage caused by impact. The scintillator protective layer 140 may be formed from a material having low moisture permeability. For example, such layers use, for example, foils, sheets, and plate-like members formed from metal materials such as Ag, Cu, Au, Al, and Ni, conductive coatings mixed with the foils, conductive polymers dispersed with stainless fibers, and the like. For example, a foil/sheet/plate-like member may be used as the scintillator protective layer 140 in consideration of workability, material cost, and the like. In addition, the stability and workability of a foil shape may be improved by bonding the above metal foil to a resin film. As this resin, for example, the following film material is used: polyethylene terephthalate, polycarbonate, vinyl chloride, polyethylene naphthalate, polyimide, or acrylic. In this case, bonding the reflection layer 130 to the scintillator protective layer 140 with a holding layer (not shown) such as an adhesive sheet in advance can prevent a positional shift between the sensor panel 110 and the reflection layer 130.

The scintillator protective layer 140 is bonded (fixed) to the sensor panel 110 with an adhesive material 150. As a material for the adhesive material 150, it is possible to use, for example, a hot-melt resin such as a polyimide-based resin, epoxy-based resin, polyolefin-based resin, polyester-based resin, polyurethane-based resin, or polyamide-based resin. Alternatively, as a material for the adhesive material 150, it is possible to use a rubber-based adhesive, acrylic-based adhesive, styrene-conjugated diene block copolymer-based adhesive, silicone-based adhesive, or the like. The adhesive material 150 can have a thickness of 1 µm to ensure adhesive strength. The adhesive material 150 can have a thickness of, for example, 1 µm to 800 µm. The scintillator layer 120 is airtightly sealed by the adhesive material 150, the sensor panel 110, and the scintillator protective layer 140.

In the case of FIG. 1, the adhesive material 150 is fixed to a surrounding portion of the pixel array 112 on the surface (upper surface) of the sensor substrate 111 on which the pixel array 112 is arranged, and is also fixed to the outer circumferential portion of the bottom surface of the scintillator protective layer 140. Instead of this, the adhesive material 150 may be fixed to the side surfaces of the sensor substrate 111 or the surface (lower surface) on the opposite side to the surface on which the pixel array 112 is arranged. The adhesive material 150 is disposed away from the scintillator layer 120 and the reflection layer 130. In this embodiment, letting the scintillator protective layer 140 have a portion which is not fixed to the scintillator layer 120 can suppress the transfer, to the scintillator layer 120, of displacement caused by the thermal expansion of the scintillator protective layer 140 or external impact. This can reduce the possibility that the scintillator layer 120 will peal off from the sensor panel 110. The upper surface of the scintillator layer 120 may not be fixed to the reflection layer 130 at all or may be partly fixed to the reflection layer 130. This can reduce the stress applied to the scintillator layer 120 and caused by thermal impact on the radiation detection apparatus 100.

Materials may be respectively selected for the sensor substrate 111, the reflection layer 130, and the scintillator protective layer 140 so as to make the reflection layer 130 have a thermal expansion coefficient larger than that of the sensor substrate 111 and smaller than that of the scintillator protective layer 140. For example, the material used for the scintillator protective layer 140 is Al (thermal expansion coefficient: $23 \times 10^{-6}$), the material used for the reflection layer 130 is Lumirror® E20 (thermal expansion coefficient: $15 \times 10^{-6}$), and the material used for the sensor substrate 111 is glass (thermal expansion coefficient: $3.8 \times 10^{-6}$). Assume that materials are selected in this manner, and the scintillator protective layer 140, the reflection layer 130, and the sensor substrate 111 are displaced by thermal impact on the radiation detection apparatus 100. In this case, the displacement of the scintillator protective layer 140 is the largest of the three, and the displacement of the sensor substrate 111 is the smallest of the three. Selecting materials in this manner can reduce the stress applied to the scintillator layer 120 and caused by thermal impact on the radiation detection apparatus 100.

The radiation detection apparatus 100 can further include a wiring substrate 160 and an electric circuit board 170. The electric circuit board 170 is configured such that a circuit pattern formed from a conductor such as a copper foil and an IC 171 are mounted on a substrate made of a material such as glass epoxy, paper phenol, or paper epoxy. The IC 171 is an integrated circuit for controlling the operation of the pixel array 112. The wiring substrate 160 can be a flexible wiring board configured such that a wiring pattern formed from a thin copper foil and an IC 161 are arranged on a film base material such as polyimide or polyester, with the surface of board being coated with an insulating film for surface protection. It is possible to connect the sensor substrate 111 to the wiring substrate 160 and connect the wiring substrate 160 to the electric circuit board 170 with a conductive adhesive material obtained by mixing a conductive filler of silver, gold, or the like with a resin binder such as acrylic or epoxy.

Figure 3A:
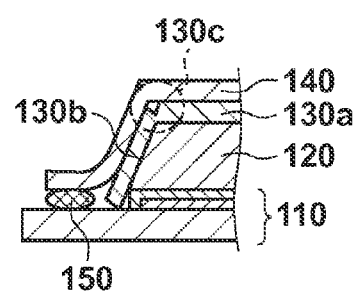
FIGS. 3A to 3D are views for explaining modifications of the radiation detection apparatus in FIG. 1.

Modifications of the radiation detection apparatus 100 shown in FIG. 1 will be described next with reference to FIGS. 3A to 3D. Four modifications of the radiation detection apparatus 100 will be described with reference to FIGS. 3A to 3D. Two or more of these modifications can be arbitrarily combined. FIG. 3A is a sectional view showing a portion of interest of a modification of the radiation detection apparatus 100. In this modification, when the reflection layer 130 is divided into a portion 130a (first portion) covering the upper surface of the scintillator layer 120 and portions 130b (second portions) covering the side surfaces of the scintillator layer 120, the reflection layer 130 has notches 130c between the portion 130a and the portions 130b. Letting the reflection layer 130 have the notches 130c allows the reflection layer 130 to easily conform to the surface (the upper surface and the side surfaces) of the scintillator layer 120 and reduces the stress received by the adhesive material 150 from the reflection layer 130. This can suppress a reduction in sealing effect by the adhesive material 150 and will improve the moisture resistance of the radiation detection apparatus 100. This modification is effective for a case in which the reflection layer 130 is thick (for example, equal to or more than 100 μm).

Figure 3B:
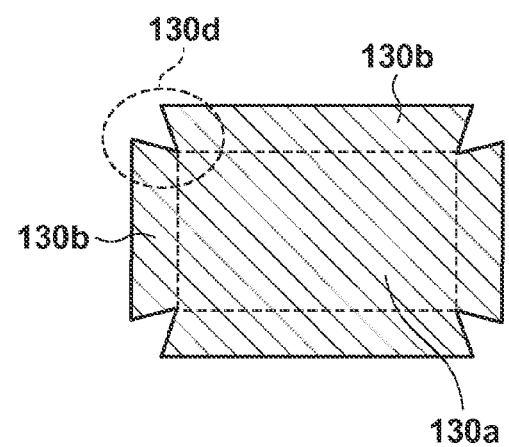

FIG. 3B is a plan view of the reflection layer 130 before it is mounted on the radiation detection apparatus 100 in a modification of the radiation detection apparatus 100. The reflection layer 130 has a rectangular shape, with notches 130d in the four corners. With these notches, the portions 130b of the reflection layer 130, which cover the side surfaces of the scintillator layer 120, are spaced apart from each other. Letting the reflection layer 130 have the notches 130d allows the reflection layer 130 to easily conform to the surface (the upper surface and the side surfaces) of the scintillator layer 120 and reduces the stress received by the adhesive material 150 from the reflection layer 130.

Figure 3C:
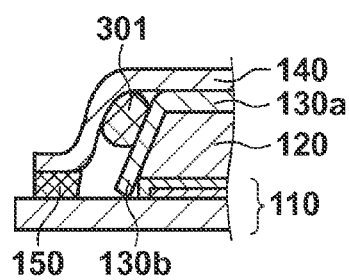

FIG. 3C is a sectional view showing a portion of interest of another modification of the radiation detection apparatus 100. In this modification, the radiation detection apparatus 100 further includes an anti-floating member 301 between the reflection layer 130 and the scintillator protective layer 140. More specifically, the anti-floating member 301 is disposed at a position at which it is in contact with the portion 130b, of the reflection layer 130, covering the side surface of the scintillator layer 120. Since the scintillator protective layer 140 is fixed to the sensor panel 110 with the adhesive material 150, the scintillator protective layer 140 pushes the anti-floating member 301 to generate a force to press the portion 130b of the reflection layer 130 against the side surface of the scintillator layer 120. Letting the radiation detection apparatus 100 have the anti-floating member 301 at this position can prevent the reflection layer 130 from separating from the scintillator layer 120. The anti-floating member 301 may be an integral member surrounding the reflection layer 130 or may be constituted by a plurality of members. The respective members may be in contact with the reflection layer 130 at different positions. The anti-floating member 301 may be thicker than the adhesive material 150. In this case, the thickness of the anti-floating member 301 can be, for example, the minimum or maximum value of the distance from a contact point with the reflection layer 130 to a contact point with the scintillator protective layer 140. In addition, the thickness of the adhesive material 150 can be, for example, the minimum or maximum value of the distance from a contact point with the sensor panel 110 to a contact point with the scintillator protective layer 140. It is possible to form the anti-floating member 301 by using, for example, a hot-melt resin such as a polyimide-based resin, epoxy-based resin, polyolefin-based resin, polyester-based resin, polyurethane-based resin, or polyamide-based resin. Alternatively, it is possible to form the anti-floating member 301 by using a rubber-based adhesive, acrylic-based adhesive, styrene-conjugated diene block copolymer-based adhesive, silicone-based adhesive, foamed rubber, or cellular rubber or a combination of them.

Figure 3D:
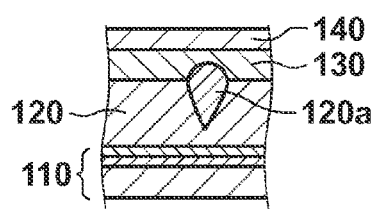

FIG. 3D is a sectional view showing a portion of interest of another modification of the radiation detection apparatus 100. In this modification, the scintillator layer 120 has a convex portion 120a formed by abnormal growth of a columnar crystal to have a height larger than that of the surrounding portion. When the scintillator layer 120 is formed by vapor-deposition of an alkali halide such as CsI:Na or CsI:Tl, the convex portion 120a can be formed. In the case of FIG. 1, the distal end of the convex portion 120a is buried in the reflection layer 130. As a material for the reflection layer 130, it is possible to use a material having a thickness larger than the height of the convex portion 120a (the difference between the apex of the convex portion 120a and the apex of the columnar crystal surrounding the convex portion 120a). Making the reflection layer 130 have a sufficient thickness can prevent the convex portion 120a from reaching the scintillator protective layer 140 through the reflection layer 130. If the scintillator protective layer 140 contains a metal, this can prevent the metal from being electrochemically corroded. If the reflection layer 130, the scintillator protective layer 140, and a holding layer (not shown) such as an adhesive sheet are bonded to each other, the thickness of the reflection layer 130 and the thickness of the holding layer can be arbitrarily set as long as the sum of the thicknesses is larger than the height of the convex portion 120a.

Figure 4A:
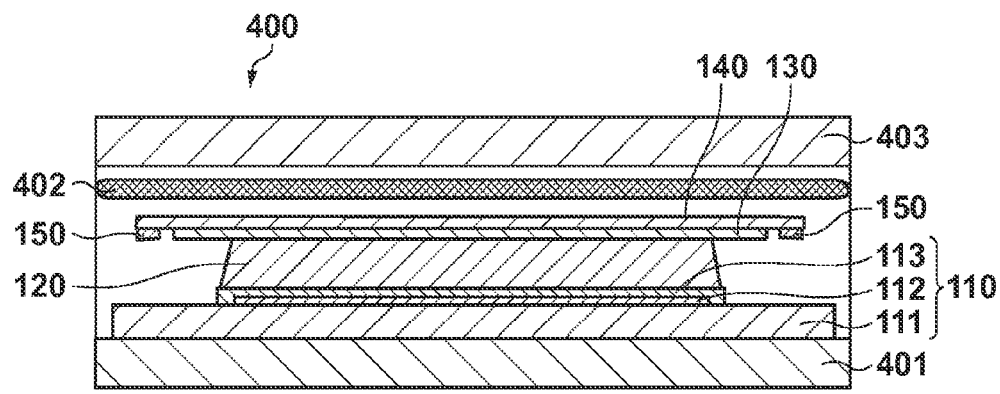
FIGS. 4A and 4B are views for explaining an example of a method of manufacturing the radiation detection apparatus in FIG. 1.

An example of a method of manufacturing the radiation detection apparatus 100 will be described next with reference to FIGS. 4A and 4B. As shown in FIG. 4A, first of all, a structure on which the scintillator layer 120 is formed is prepared on the sensor panel 110 described above. This structure may be formed by an existing method, and hence a description of the manufacturing method will be omitted. The scintillator layer 120 is disposed on the sensor panel 110 on a stage having a flat surface. The height of a convex portion formed by abnormal growth of the scintillator layer 120 may be reduced by applying a pressure on the scintillator layer 120 with a metal roller.

This prepared structure is set on a heating stage 401 of a vacuum pressing machine 400 so as to dispose the scintillator layer 120 on the sensor panel 110. Subsequently, the reflection layer 130 and the scintillator protective layer 140 are sequentially disposed on the scintillator layer 120. The adhesive material 150 is applied to the outer circumferential portion of the bottom surface of the scintillator protective layer 140 so as to surround the overall reflection layer 130. As a material for the adhesive material 150, it is possible to use, for example, a hot-melt resin. The hot-melt resin can be applied to the outer circumferential portion by using, for example, a dispenser. As a material for the reflection layer 130, it is possible to use, for example, Lumirror® E20. The reflection layer 130 and the scintillator protective layer 140 may be arranged on the scintillator layer 120 after being fixed to each other with an adhesive material or the like.

Figure 4B:
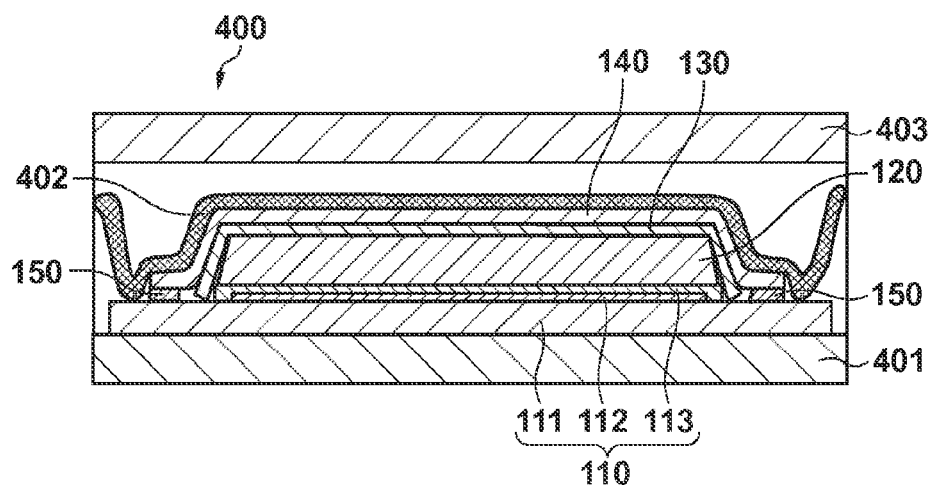

As shown in FIG. 4B, the space between a press member 402 (diaphragm rubber or the like) and the heating stage 401 is depressurized, and the space between the press member 402 and a heater 403 is pressurized. The pressure to be applied is adjusted to fall within the range of 1 kg/cm$^2$ to 50 kg/cm$^2$. With this adjustment, the heating stage 401 heats the sensor substrate 111, and the heater 403 heats the air in the vacuum pressing machine 400. With this operation, the press member 402 presses the scintillator protective layer 140 against the sensor substrate 111 to bond the adhesive material 150 to the surface of the sensor substrate 111 by pressure. The heating stage 401 and the heater 403 then stop heating, and the apparatus cools the air in the vacuum pressing machine 400 by heat dissipation. Subsequently, the air pressure in the vacuum pressing machine 400 is restored to the initial level, and the sensor panel 110 to which the reflection layer 130 and the scintillator protective layer 140 are mounted is extracted. The hot-melt resin forming the adhesive material 150 is melted at a temperature higher than a melting start temperature by about 10° C. to 60° C. for several sec to several min and becomes adherable. A heating/pressurizing process (heat sealing) will make the adhesive material 150 have a thickness smaller than that before the process and improve the moisture resistance of the scintillator layer 120. In addition, since the convex portion 120a of the scintillator layer 120 is harder than the reflection layer 130, the above pressurizing process buries the upper portion of the convex portion 120a in the reflection layer 130.

Figure 5A:
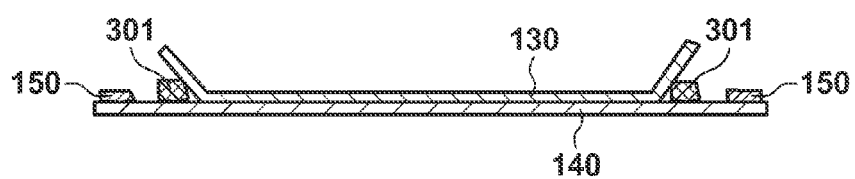
FIGS. 5A and 5B are views for explaining a method of manufacturing a radiation detection apparatus according to some other embodiments of the present invention.
Figure 5B:
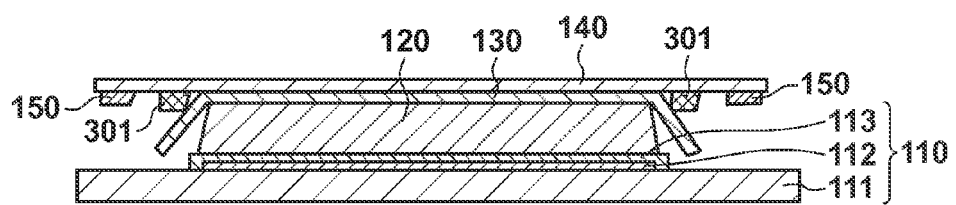

A method of manufacturing a modification of the radiation detection apparatus 100 shown in FIG. 3C will be described next with reference to FIGS. 5A and 5B. First of all, as shown in FIG. 5A, the inside portion of the reflection layer 130 (the portion covering the upper surface of the scintillator layer 120 of the radiation detection apparatus 100) is bonded to the scintillator protective layer 140 with an adhesive sheet or the like. The scintillator protective layer 140 is coated with the adhesive material 150. Thereafter, the outside portion of the reflection layer 130 (the portion covering the side surfaces of the scintillator layer 120 in the radiation detection apparatus 100) is bent toward the center side and temporarily fixed with a tape or the like. The anti-floating member 301 is then disposed in the gap between the scintillator protective layer 140 and the reflection layer 130, and the tape or the like used for temporary fixing is removed. As shown in FIG. 5B, thereafter, the reflection layer 130 and the scintillator protective layer 140 are mounted on the scintillator layer 120, and the scintillator protective layer 140 is bonded to the surface of the sensor substrate 111 by pressurization in the same manner as that shown in FIGS. 4A and 4B.

Figure 6:
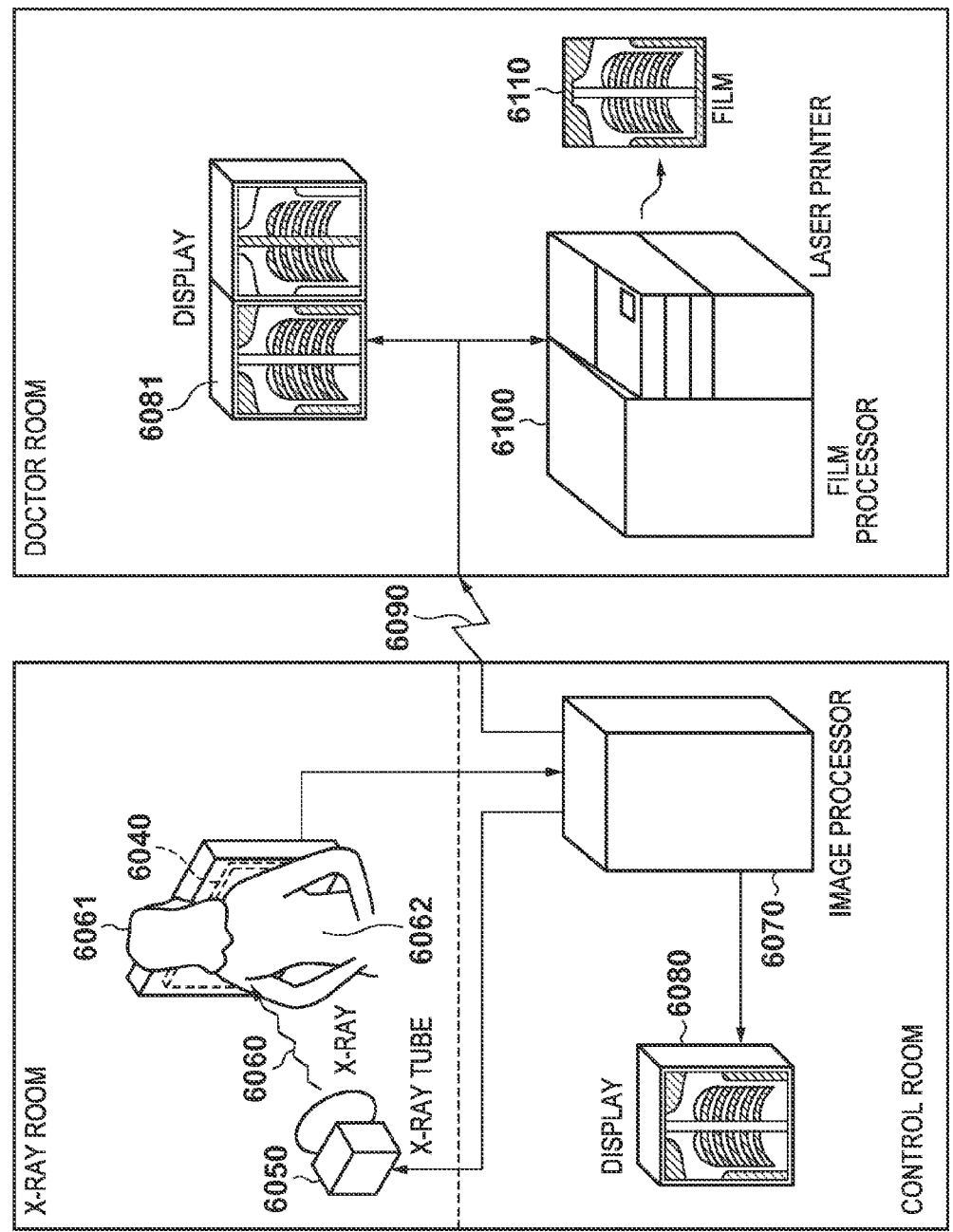
FIG. 6 is a view for explaining an example of the arrangement of a radiation detection system according to an embodiment of the present invention.

FIG. 6 is a view showing an application example of the radiation detection apparatus according to the present invention to a radiation diagnostic system (radiation detection system). X-rays 6060 generated by an X-ray tube 6050 (radiation source) are transmitted through a chest region 6062 of an object or a patient 6061 and enter a radiation detection apparatus 6040. The radiation detection apparatus 6040 may be either of the above radiation detection apparatuses. The incident X-rays include information about the inside of the body of the patient 6061. The scintillator emits light as X-rays enter, and electrical information is obtained by photoelectric conversion. This information is converted into a digital signal. An image processor 6070 performs image processing of the signal. It is possible to observe the resultant image on a display 6080 in a control room. Note that the radiation detection system includes at least a radiation detection apparatus and a signal processing unit which processes signals from the radiation detection apparatus.

In addition, it is possible to transfer this information to a remote place via a transmission processing unit such as a telephone line 6090. The transferred information can be displayed on, for example, a display 6081 serving as a display unit installed in another place, for example, a doctor room. Furthermore, it is possible to store this information in a recording unit such as an optical disk. In this manner, another doctor in a remote place can diagnose the object. A film processor 6100 serving as a recording unit can record the information on a film 6110.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-059062, filed Mar. 21, 2013, which is hereby incorporated by reference herein in its entirety.

What is claimed is:
1. A radiation detection apparatus comprising:
a sensor panel which includes a photoelectric conversion unit configured to convert light into charge;
a scintillator layer disposed above the photoelectric conversion unit of said sensor panel and configured to convert radiation into light having a wavelength convertible by the photoelectric conversion unit;

a reflection layer disposed above said scintillator layer and configured to reflect part of light generated by said scintillator layer toward said sensor panel; and a protective layer which covers said scintillator layer from above said reflection layer, wherein said scintillator layer is fixed on said sensor panel, said reflection layer is fixed on said protective layer, part of said protective layer is bonded to said sensor panel with an adhesive material so as to seal said scintillator layer and said reflection layer with said protective layer and said sensor panel, and an upper surface of said scintillator layer includes a portion which is not fixed to said reflection layer.

2. The apparatus according to claim 1, wherein the adhesive material is spaced apart from said reflection layer and said scintillator layer.

3. The apparatus according to claim 1, wherein said sensor panel includes a sensor substrate on which the photoelectric conversion unit is arranged, and a thermal expansion coefficient of said reflection layer is larger than a thermal expansion coefficient of said sensor substrate and is smaller than a thermal expansion coefficient of said protective layer.

4. The apparatus according to claim 1, wherein part of the upper surface of said scintillator layer is in contact with said reflection layer.

5. The apparatus according to claim 1, wherein a gap is provided between part of the upper surface of said scintillator layer and said reflection layer.

6. The apparatus according to claim 1, wherein said scintillator layer includes an aggregate of columnar crystals formed by vapor deposition, and a distal end of a columnar crystal, of the aggregate of columnar crystals, which is abnormally grown is buried in said reflection layer.

7. The apparatus according to claim 1, wherein said protective layer contains a metal material.

8. The apparatus according to claim 1, wherein said protective layer is an insulator.

9. The apparatus according to claim 8, wherein said reflection layer contains a particulate inorganic material and an organic material which holds the inorganic material.

10. The apparatus according to claim 1, wherein said reflection layer has a reflectance of not less than 80% with respect to at least light having some of wavelengths convertible by the photoelectric conversion unit.

11. The apparatus according to claim 1, wherein said reflection layer includes a first portion covering the upper surface of said scintillator layer and a second portion covering a side surface of said scintillator layer, and a notch is provided between the first portion and the second portion.

12. The apparatus according to claim 1, wherein said reflection layer includes a first portion covering the upper surface of said scintillator layer and a second portion covering a side surface of said scintillator layer, and the apparatus further comprises an anti-floating member which is provided between said protective layer and said reflection layer and configured to press the second portion of said reflection layer against a side surface of said scintillator layer which is covered by the second portion.

13. A radiation detection system comprising:

a radiation detection apparatus defined in claim 1; and signal processing unit which processes a signal obtained by said radiation detection apparatus.

14. A radiation detection apparatus comprising:

a sensor panel which includes a photoelectric conversion unit configured to convert light into charge;

a scintillator layer disposed above said photoelectric conversion unit of said sensor panel and configured to convert radiation into light having a wavelength convertible by said photoelectric conversion unit;

a reflection layer disposed above said scintillator layer and configured to reflect part of light generated by said scintillator layer toward said sensor panel; and a protective layer which covers said scintillator layer from above said reflection layer, wherein said scintillator layer is fixed on said sensor panel, said reflection layer is fixed on said protective layer, part of said protective layer is bonded to said sensor panel with an adhesive material so as to seal said scintillator layer and said reflection layer with said protective layer and said sensor panel, and an upper surface of said scintillator layer is not fixed to said reflection layer.

15. The apparatus according to claim 14, wherein said scintillator layer has an upper surface, and said upper surface of said scintillator layer is not fixed to said reflection layer with an adhesive material.

16. The apparatus according to claim 14, wherein said protective layer contains a resin film and a metal foil, and said reflection layer contains a particulate inorganic material and an organic material which holds the inorganic material.

17. A radiation detection system comprising:

a radiation detection apparatus defined in claim 14; and a signal processing unit which processes a signal obtained by said radiation detection apparatus.

18. A radiation detection apparatus comprising:

a sensor panel which includes a photoelectric conversion unit configured to convert light into charge;

a scintillator layer disposed above the photoelectric conversion unit of said sensor panel and configured to convert radiation into light having a wavelength convertible by the photoelectric conversion unit;

a reflection layer disposed above said scintillator layer and configured to reflect part of light generated by said scintillator layer toward said sensor panel; and a protective layer which covers said scintillator layer from above said reflection layer, wherein said scintillator layer is fixed on said sensor panel, said reflection layer is fixed on said protective layer, part of said protective layer is bonded to said sensor panel with an adhesive material so as to seal said scintillator layer and said reflection layer with said protective layer and said sensor panel, and said scintillator layer has an upper surface and said upper surface of said scintillator layer includes a portion which is not fixed to said reflection layer with an adhesive material.

19. The apparatus according to claim 18, wherein said protective layer contains a resin film and a metal foil, and said reflection layer contains a particulate inorganic material and an organic material which holds the inorganic material.

20. A radiation detection system comprising:
a radiation detection apparatus defined in claim 18; and
a signal processing unit which processes a signal obtained by said radiation detection apparatus.

* * * * *